United States Patent
Krogman

[15] 3,642,207
[45] Feb. 15, 1972

[54] ROTARY SPRAYER FOR WASHING MACHINE

[72] Inventor: Stanley R. Krogman, Rossville, Ill.

[73] Assignee: FMC Corporation, San Jose, Calif.

[22] Filed: Dec. 30, 1969

[21] Appl. No.: 889,053

[52] U.S. Cl. .............................................239/251, 239/259
[51] Int. Cl. .........................................................B05b 3/06
[58] Field of Search ...............................239/251, 259, 258

[56] References Cited

UNITED STATES PATENTS

| | | | |
|---|---|---|---|
| 2,983,452 | 5/1961 | Lindbloom | .............................239/259 |
| 3,355,110 | 11/1967 | Thompson | .........................239/258 X |

Primary Examiner—Lloyd L. King
Attorney—F. W. Anderson and C. E. Tripp

[57] ABSTRACT

A rotary spray assembly for a utensil washer which has minimized rotary friction and can be employed in an upright or inverted position. The assembly includes a tubular open-ended manifold having a laterally extending spray arm. The manifold is mounted internally of and between a nonrotating cap and a fixed housing in opposed collar bearings. The manifold is necked down at the ends forming opposed shoulders that form a rotary sealing engagement with the end faces of ring seats loosely surrounding the necked down ends of the manifold. O-rings are employed to locate the ring seats and form a nonrotating seal between the side of the ring seat and the bearing housing.

6 Claims, 4 Drawing Figures

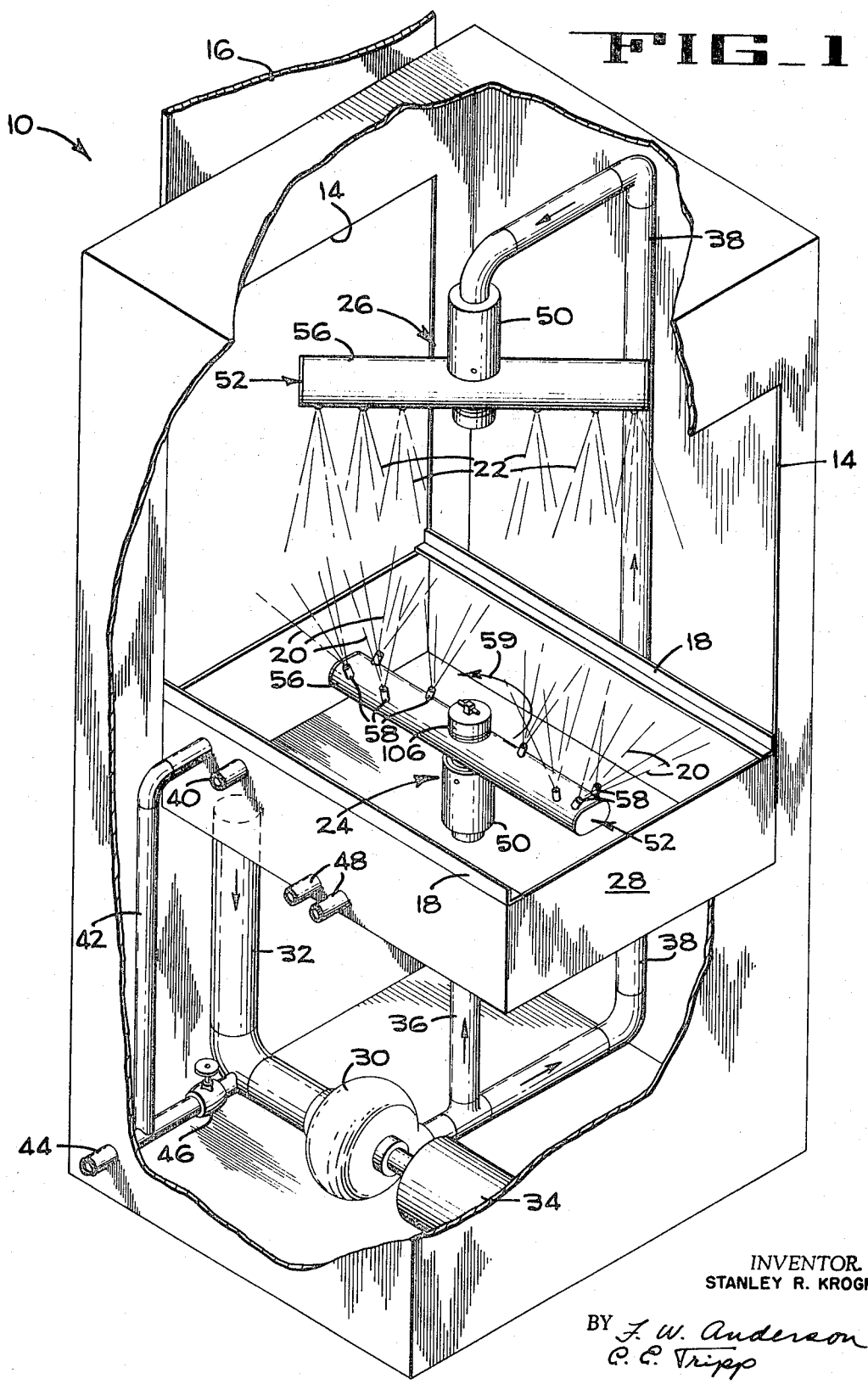
PATENTED FEB 15 1972 3,642,207
SHEET 1 OF 2
FIG_1
INVENTOR.
STANLEY R. KROGMAN
BY F. W. Anderson
C. C. Tripp
ATTORNEYS

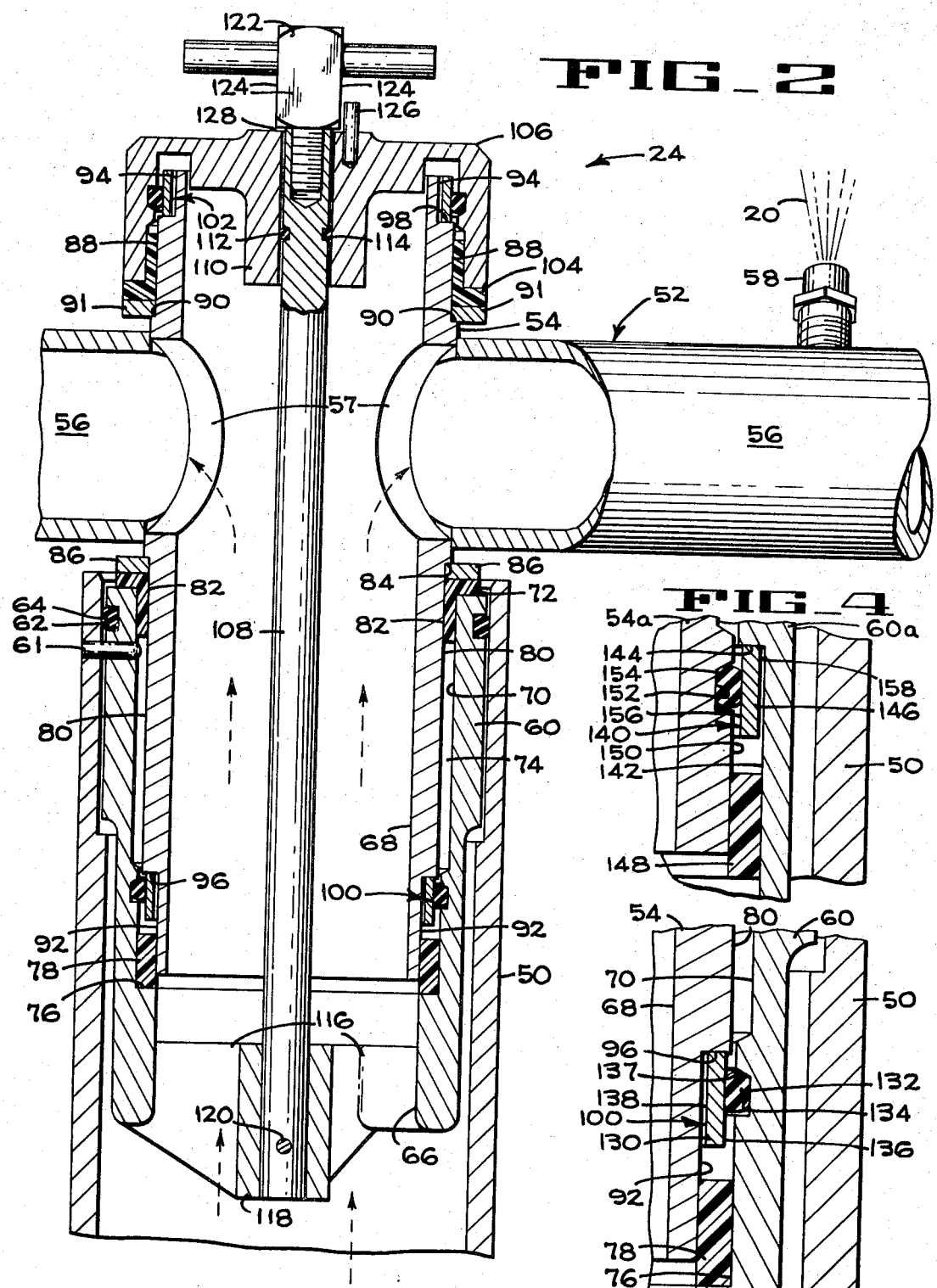

ROTARY SPRAYER FOR WASHING MACHINE

BACKGROUND OF THE INVENTION

1. Field of the Invention

This invention relates to improvements in rotary spray devices such as employed in dish washing machines. In particular, the invention is directed to an improved bearing and seal mounting to minimize wear and reduce rotational friction on rotary manifold.

2. Description of Prior Art

Walker U.S. Pat. No. 2,576,982, Dec. 4, 1951 describes a sprayer wherein differential fluid pressure on the spray head is balanced by a piston attached to the spray head. The resilient sealing members rub directly between relatively rotating parts.

In the sprayer of Merseles U.S. Pat. No. 1,737,257, Nov. 26, 1929, both ends of the manifold are open so that there is not differential pressure thereon. The outer end of the manifold is closed by a fixed disc. There are no resilient seals between relatively rotating parts and fluid leakage is minimized by close fits.

SUMMARY OF THE INVENTION

The sprayer of the present invention is of the pressure-balanced manifold type, as in the Merseles patent. The manifold is radially and axially located by freely running bearings in the cap and inlet bearing housing in which the bearings do not provide a seal. O-ring seals are employed in a manner which eliminates relative rotation between the O-rings and the surfaces which they engage. This is accomplished by providing loosely mounted ring seats between the O-rings and the rotating manifold. Under pressure the O-rings deform creating a seal between the O-ring and one side of the ring seat so that these seats do not rotate with respect to the O-rings. A clearance is maintained between the other side of the seat and the rotating manifold. Relative rotation does occur between end faces of the ring seats and the faces of shoulders formed on the rotating manifold, but these surfaces provide a low friction engagement as well as a liquid seal.

A modified form is shown in which the O-ring and ring seats are mounted on the rotating manifold, being stationary with respect thereto, and the seat engaging shoulders are formed in the nonrotating housing.

DESCRIPTION OF THE DRAWINGS

FIG. 1 is a perspective view of a washing machine having portions broken away to illustrate the use of the rotary sprayers.

FIG. 2 is an enlarged partial central vertical section of the lower rotary spray assembly of the present invention.

FIG. 3 is an enlarged portion of FIG. 2 showing the improved seal of the present invention.

FIG. 4 is similar to FIG. 3 showing a modified form of the improved seal.

DESCRIPTION OF THE INVENTION

General Description of the Washing Machine

In the illustration of FIG. 1, a typical washing machine 10 has been illustrated to describe the present invention; but it is to be understood that the principles of the present invention may be readily applied to other types of washing machines than illustrated.

As seen in the FIG. 1, the washing machine generally comprises a cabinet having a pair of side openings 14 located on opposing sides of the cabinet. These openings are closed by a pair of vertical sliding doors 16 (only one being shown) so that a rack (not shown) containing various culinary articles such as dishes, pans, etc., may be placed into the machine on one side and removed from the other. A pair of guide rails indicated at 18 support the rack within the cabinet in such a manner that culinary articles therein are subjected to a spray from beneath indicated at 20 and a downwardly directed spray 22 to clean the opposing sides of the articles. These sprays are produced by identical rotating spray assemblies 24 and 26. The washing solution sprayed against the articles within the rack drains into a recirculating sump 28 from where it is supplied to a centrifugal pump 30 via a return line 32. An electrical motor 34 drives the pump 30 producing an output pressure in the range of 50 to 60 p.s.i. at a flow rate of approximately 100 gallons per minute. The washing solution from the pump under pressure is supplied to the lower and upper rotating spray assemblies 24 and 26 by means of supply lines 36 and 38 respectively.

The sump also necessarily includes the customary water inlet line 40 and an overflow line 42 that is connected to a drain line 44 to prevent overflow of the sump. The drain line is also connected to the return line 32 to enable draining of the entire system upon opening of a valve 46.

Rinsing of the utensils is accomplished in the well-known manner by employing stationary rinsing sprays (not shown) connected to the normally available external water supply and also which then drains into the sump. In order to maintain the washing solution at the desired temperature, a heat exchanger (not shown) is located within the tank and is supplied by steam lines as indicated at 48.

The washer of course also includes the necessary timing and control system omitted here for clarity, to control such things as temperature, washing solution level and duration of the washing and rinsing cycles.

Improved Rotating Spray Assembly

The rotating spray assemblies 24 and 26 are of identical construction and are mounted on the ends of supply lines 36 and 38 by means of pipe couplings 50. The assemblies each include a rotating head 52 comprising a central tubular manifold 54 and a spray arm 56 extending to either side thereof. As seen in FIGS. 1 and 2, the washing sprays 20, for the lower assembly, are produced by the washing fluid that flows up through the center of the manifold, then into the spray arm 56 through communicating passages 57 from where it exits through multiple upwardly directed nozzles 58.

As illustrated in FIG. 1, the spray nozzles are inclined with respect to the vertical to produce a spray pattern sufficient to wash culinary articles located above. The nozzles 58 are also inclined with respect to the vertical to produce a net resultant horizontal thrust thereby causing rotation of the head 52, as indicated by the arrow 59. In order to provide the greatest washing efficiency, it is desirable that the rotational friction experienced by the rotary head 52 be held to a minimum so that the amount of spray that must be employed to produce the rotational thrust can be held to a minimum.

The lower rotating spray assembly 24 will now be described in detail with reference to FIG. 2. In order to support the entire spray assembly 24, an inlet bearing housing 60 is rigidly mounted in the pipe coupling 50 by means of three retaining pins 61 (only one being shown). A seal is effected between the housing and the coupling by means of an O-ring 62 retained within a groove 64 formed in the bearing housing 60.

The rotating manifold is mounted in a telescoping relation with the bearing housing. In the preferred embodiment, the lower end of the rotating tubular manifold 54 is received within the inlet bearing housing 60 that contains a central bore 66 to permit washing fluid to enter the interior of the rotating manifold defined by the interior cylindrical wall 68. The upper portion of the bearing housing is counterbored to provide a mounting surface 70 for a split ring collar bearing 72 and to provide clearance between the rotating manifold and the bearing housing as indicated at 74. The split ring collar bearing 72 is manufactured of a suitably low friction material such as nylon and is made to a slightly larger diameter than the mounting surface indicated at 70 so that the seal must be compressed and inserted into the bore and by its own resilience springs outwardly and is retained firmly against the upper portion of the bearing housing. Toward the lower end of the bearing housing the interior bore 66 thereof is also recessed to provide a seat 76 for receiving a press-fitted solid sleeve bearing 78 of similar material to the collar bearing 72.

The outer surface of the tubular manifold 54 is machined or ground to provide a smooth surface 80 forming a free-running fit with an interior surface 82 of the collar bearing 72 and also forms a shoulder 84. In order that the collar bearing can support the manifold axially as well as radially, a thrust washer 86 is placed against the shoulder and is retained by means of a location fit between its inner diameter and the surface 80. On the other side of the spray arm 56 a similar surface 88 and shoulder 90 are formed on the manifold 54 and a thrust washer 91 is likewise retained thereon.

The rotating manifold 54 is necked down at each end defining an additional pair of recessed surfaces 92 and 94 forming axially outward facing opposed shoulders 96 and 98 for accommodating identical seal assemblies 100 and 102 which will be described in detail hereafter. The lower recessed surface 92 extends into the lower bearing 78 and forms a free-running fit therewith.

The upper portion of the rotating manifold is supported by a split ring collar bearing 104 mounted in a manifold cap 106 in the identical manner as the collar bearing 72 is mounted in bearing housing 54. The cap 106, which extends above and encloses the upper end of the manifold, is slidingly mounted on s shaft 108 that extends through an integral boss 110 in the cap. To prevent leakage between the cap and shaft an O-ring seal 112 is mounted in a groove 114 of the shaft and bears on the inner surface of the boss 110.

The lower end of the shaft 108 is rigidly secured to the bottom of the bearing housing by means of a series of integral webs 116 that support a central boss 118 in which the shaft 108 is pressed and further retained by a pin 120. In order to retain the manifold cap on the shaft 108, a wing-screw 122 having flat side portions 124, is turned down against the upper end of shaft 108. A pin indicated at 126 is then inserted into the cap and prevents rotation thereof by engagement with the flattened sides 124. When the spray assembly 24 is not under fluid pressure, a gap in the order of 1/16 to 1/8 of an inch exists between the bottom of the wing-screw 122 and the top of the manifold cap 106 as indicated at 128. When the spray assembly is subjected to an internal fluid pressure, the cap rises until it abuts the bottom of screw 122 thereby providing a gap between the upper split ring collar bearing 104 and the upper thrust washer 91 which eliminates friction therebetween.

It is important to note that the split ring bearings 72 and 104 as well as the lower bearing 78 do not provide a fluid or pressure seal between the rotating and fixed parts of the spray assembly but are designed for a minimum of free running friction of the rotating parts. The bearings provide both axial and radial support for the rotating manifold when the spray assembly is employed in either the upright or inverted position.

In order to provide a positive but low friction sealing action the previously mentioned seal assemblies 100 and 102 are provided between the rotating manifold 54, the bearing housing 60 and manifold cap 106. These seal assemblies are identical in construction and differ only in that the nonrotating member against which they seal in one case is the bearing housing 60 and in the other the manifold cap 106. Referring now to FIG. 3, wherein the enlarged lower seal assembly 100 is shown, it is seen that the assembly includes a rigid nonresilient tubular shaped seal 130, made of a material such as bronze, and a rubber O-ring 132.

The O-ring 132 is retained in an O-ring groove 134 formed in the inner bore of the bearing housing 58 and is of the type that permits deformation of the O-ring under pressure. The size of the O-ring 132 is selected to cooperate with the outside surface of the seat indicated at 136 in such a manner that when the seal assembly is not subjected to any pressure the O-ring maintains a light touching contact thereby locating the seal 130. In order to permit larger manufacturing tolerances and still insure that a seal is formed between the O-ring 132 and the outside surface 136 of the seal in the event of a clearance therebetween, the O-ring groove 134 is provided with a tapered side wall 137 that slants toward the associated shoulder 96 on the manifold. The tapered wall wedges the O-ring 132 inwardly against the seat 138 initiating the locating and sealing action when fluid flow impinges on the O-ring moving it upwardly in the groove.

The seat has an internal surface 138 which is of such a diameter that a positive clearance fit is maintained between the surface 138 and the recessed necked down surface 92 of the rotating manifold 54. The seal between the rotary and stationary parts is accomplished by the engagement between the upper surface of the seat 130 and the shoulder of the rotating manifold indicated at 96.

Modified Form

A modified form of the improved seal is shown at 140 in FIG. 4 and corresponds to the lower seal assembly 100 described in FIG. 3. In this form the bearing housing 60a has a recessed surface 142 forming an axially outwardly directed shoulder 144 thereon. A rigid tubular ring seat 146 is inserted therein and a sleeve bearing 148 is then pressed in from below. The rotating manifold 54a has an exterior surface 150 that provides a free-running fit with the bearing 148 and contains an O-ring groove 152 and O-ring 154 similar to those described in connection with FIG. 3.

The ring seat 146 has an inner side surface 156 that engages the O-ring 154 and an outer side surface 158 of sufficiently smaller diameter than the recessed surface 142 in the housing 60a so that no contact or friction exists therebetween.

Operation

When washing fluid under pressure is supplied to the lower rotating spray assembly 24, the fluid enters the interior bore 66 of the bearing manifold 60 passing between webs 116 and into the interior of the rotating manifold 54 as seen in FIG. 2. From the manifold the fluid flows into the laterally extending spray arm 56 via communicating passages 57 and is ejected through multiple spray nozzles 58 forming the upwardly direct washing sprays 20.

As the pressure increases in the spray assembly, fluid passes between the sleeve bearing 78 and the recessed surface 92 of the rotating manifold exerting pressure behind the seal assembly 100. Similarly, fluid pressure passing beneath the cap 106 and above the upper end of the rotating manifold 54 exerts pressure behind the identical seal assembly 102. As seen in FIG. 3, this pressure forces the ring seat 130 upwardly against the axially outward facing shoulder 96 creating a seal between seat and the rotating manifold 54. As the pressure increases the O-ring 132 deforms under pressure creating an increasingly greater inward force on the tubular ring seat so that the seat and O-ring do not rotate with the manifold. However, the ring seat 130 is sufficiently rigid so that it does not deform and consequently retains the clearance indicated between surface 92 of the bearing housing and 138 of the ring seat.

The resistance to rotation created by the seat 130 against shoulder 96 is minimal and proportional to the static pressure within the manifold 54 because the rigid seat does not deform in the manner in which an O-ring seal does. Therefore, no substantial increased friction between the seal and the rotating surface is created as pressure increases. In addition, any vertical force exerted by the seat 130 against the rotating manifold 54 is counterbalanced by a downwardly directed equal force created by the upper seat assembly 102 against the opposed axially outward facing shoulder 98.

The operation of the modified seal assembly 140 is substantially identical to seal assembly 100 with the following exception. In the assembly 140, the O-ring 154 and ring seat 146 do rotate with respect to the bearing housing 60a, but they do not rotate relative to the rotating manifold. Here, as in seal assembly 100, the rotating seal is formed by the engagement between the end face of the seat 146 and the axially outward facing shoulder 144.

The pressure within the rotating manifold also causes the manifold cap to move upwardly on shaft 108 thereby creating a gap between the thrust bearing surface of the split ring collar bearing 104 and thrust washer 91.

As a result of identical construction of opposing ends of the rotating manifold and seal assemblies 100 and 102 in engagement therewith no net resultant vertical thrust is produced against the rotating manifold as the pressure within the manifold increases. It will also be apparent that the rotating friction between the vertical surfaces of the collar bearings 72 and 104 as well as sleeve bearings 78 also do not vary with the pressure within the rotating spray assembly. The unbalanced vertical force that is transmitted between the thrust washer 86 on the rotating hub and the engaging surface of the collar bearing 72 is created by the weight of the rotating manifold and spray arms 56, the water contained therein, and the minimal downward thrust created by the sprays 20 from the multiple spray nozzles 58.

With respect to the upper spray assembly 26 which is of identical construction to the lower spray assembly 24, the unbalanced vertical force is carried by the split ring collar bearing and thrust washer corresponding to the bearing 104 and washer 91 described with respect to the lower spray assembly. In fact, the thrust created by the sprays 22 is directed upwardly reducing the effect of the weight of water and rotating parts against the thrust bearing surface mounted in the manifold cap of the upper spray assembly.

Although the best mode contemplated for carrying out the present invention has been herein shown and described, it will be apparent that modification and variation may be made without departing from what is regarded to be the subject matter of the invention.

What is claimed is:

1. A rotary spray device comprising a fixed tubular inlet pipe, a tubular housing element mounted in said pipe in sealed relation thereto and having a spider at its inner end, a nonrotary cup-shaped cap element opposing said housing element, a tubular rotary manifold element telescoped within said housing and cap elements and having radial spray arms projecting out from between these elements, liquid seals between opposite end portions of said tubular manifold element and said housing and cap elements, radial bearing means between said tubular manifold element and said housing and cap elements, axially opposed thrust bearing means between said tubular manifold element and said housing and cap elements adjacent said spray arms, a stem projecting from said spider through said cap element, and means on said stem for retaining said cap element against internal pressure in the device.

2. The device of claim 1, wherein said cap element is apertured to slidably receive said stem, a liquid seal between the cap element and the stem, said cap element retaining means being detachably secured to said stem.

3. The device of claim 1, wherein said radial bearing means includes radial bearings between the inner and outer end portions of said tubular housing element and said tubular manifold element.

4. The device of claim 1, wherein said axially opposed thrust bearing means comprises a thrust bearing at the outer end of said tubular housing element and at the rim of said cap element, and thrust shoulders projecting radially from said rotary manifold element.

5. The device of claim 4, wherein said thrust bearings have tubular collars extending within said housing cap elements to form radial bearings.

6. A rotary spray device comprising a fixed element including an inlet housing and a cap, an open-ended rotary manifold element having radial spray arms, the lower end of said manifold element in telescoping relation with said housing, said cap closing the outer end of the manifold element, radial bearings between said fixed and rotary elements, means forming axially oppositely facing shoulders on one of said elements, ring seats loosely surrounding said one element with each ring seat having an end face for sealing engagement with the associated shoulder, and rubberlike sealing means between the other of said elements and the associated ring seat for radially locating the ring seats while forming a fluid seal therewith, said device further including opposed axial bearings between said fixed and rotary elements, opposed thrust bearing on said manifold, a stem projecting through said cap and secured to and projecting through said housing, and means for mounting said cap for limited sliding movement on the stem to provide a clearance between said axial bearings and said thrust means in response to fluid pressure.

* * * * *